United States Patent
Park

(10) Patent No.: US 9,102,323 B2
(45) Date of Patent: Aug. 11, 2015

(54) HYBRID VEHICLE HAVING BRAKE FUNCTION

(71) Applicants: Hyundai Motor Company, Seoul (KR); Kia Motors Corporation, Seoul (KR)

(72) Inventor: Joonyoung Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/137,179

(22) Filed: Dec. 20, 2013

(65) Prior Publication Data

US 2015/0105215 A1    Apr. 16, 2015

(30) Foreign Application Priority Data

Oct. 10, 2013   (KR) .................. 10-2013-0120742

(51) Int. Cl.
*B60K 6/20*    (2007.10)
*B60W 20/00*    (2006.01)
*B60W 10/184*    (2012.01)

(52) U.S. Cl.
CPC ............. *B60W 20/20* (2013.01); *B60W 10/184* (2013.01); *Y10S 903/947* (2013.01)

(58) Field of Classification Search
CPC .. B60W 20/20; B60W 10/184; Y10S 903/947
See application file for complete search history.

(56) References Cited

U.S. PATENT DOCUMENTS

| | | | |
|---|---|---|---|
| 5,786,640 A * | 7/1998 | Sakai et al. | 290/17 |
| 6,554,088 B2 * | 4/2003 | Severinsky et al. | 180/65.23 |
| 7,315,090 B2 * | 1/2008 | Yang | 290/40 C |
| 8,731,753 B2 * | 5/2014 | Smith et al. | 701/22 |
| 8,758,192 B2 * | 6/2014 | Smith et al. | 477/5 |
| 2002/0094908 A1 * | 7/2002 | Urasawa et al. | 477/3 |

FOREIGN PATENT DOCUMENTS

| | | | |
|---|---|---|---|
| JP | 2006-280161 A | | 10/2006 |
| JP | 2006280161 A | * | 10/2006 |
| JP | 2007126092 A | | 5/2007 |
| KR | 100867791 B1 | | 11/2008 |
| KR | 2013-0030507 A | | 3/2013 |

* cited by examiner

*Primary Examiner* — Derek D Knight
(74) *Attorney, Agent, or Firm* — McDermott Will & Emery LLP

(57) ABSTRACT

A hybrid vehicle having a brake function includes a hybrid starter and generator (HSG) for starting an engine or generating electricity by the engine. A clutch is disposed on a route for transmitting torque of the engine to a wheel, wherein the clutch selectively transmits the torque. A motor is disposed at a rear side of the clutch on the route, wherein the motor adds torque or generates electricity. An inverter is electrically connected to the HSG and the motor, and a battery is electrically connected to the inverter, wherein the battery stores or outputs electrical energy. A controller releases the clutch, controls the motor to generate the electricity through the torque transmitted from the wheel to the motor, and controls the HSG to consume the electricity generated from the motor, if a braking demand condition is satisfied.

7 Claims, 5 Drawing Sheets

HYBRID VEHICLE HAVING BRAKE FUNCTION

CROSS-REFERENCE TO RELATED APPLICATION

This application claims the benefit of priority to Korean Patent Application No. 10-2013-0120742 filed in the Korean Intellectual Property Office on Oct. 10, 2013, the entire contents of which are incorporated herein by reference.

TECHNICAL FIELD

The present disclosure relates to a hybrid vehicle having a brake function that runs by the action of a motor and an internal combustion engine and performs the brake function through the motor and the engine. Thus, regenerative braking is securely performed when torque demand is less than 0.

BACKGROUND

Generally, hybrid vehicles have a clutch, a motor, and a transmission disposed on a power delivery path formed from an internal combustion engine to a wheel; and a hybrid starter and generator (HSG) disposed on the engine to start the engine or to control a rotational speed of the engine.

The clutch performs an engine brake function, such that torque is transmitted from the wheel to the engine through the transmission, the motor, and the clutch, wherein a part of the torque generates electricity through the motor. An accurate braking force cannot be realized because the torque is transmitted through the transmission.

Further, because the motor performs charging and discharging, a regenerative braking torque changes depending on a state of charge (SOC) of a battery, which operates the motor and the HSG, thereby making it harder to realize a secure braking force.

The above information disclosed in this Background section is only for enhancement of understanding of the background of the disclosure, and therefore, it may contain information that does not form the prior art that is already known in this country to a person of ordinary skill in the art.

SUMMARY

The present disclosure provides a hybrid vehicle having a brake function which is capable of performing regenerative braking through a motor and simultaneously rotate an engine, thus securely performing the regenerative braking.

A hybrid vehicle having a brake function according to an exemplary embodiment of the present disclosure may include a hybrid starter and generator (HSG) for starting an internal combustion engine or generating electricity by the engine. A clutch is disposed on a route for transmitting torque of the engine to a wheel, wherein the clutch selectively transmits the torque. A motor is disposed at a rear side of the clutch on the route, wherein the motor adds torque or generates electricity. An inverter is electrically connected to the HSG and the motor. A battery is electrically connected to the inverter, wherein the battery stores or outputs electrical energy. A controller releases the clutch, controls the motor to generate the electricity through the torque that is transmitted from the wheel to the motor, and controls the HSG to consume the electricity that is generated from the motor, if a braking demand condition is satisfied.

The controller may calculate a braking torque demand depending on the braking demand condition and control the motor to generate the electricity in accordance with the braking torque demand, and the electricity generated from the motor operates the HSG through the inverter.

The electricity generated from the motor may not be charged in the battery and is consumed by the HSG through the inverter.

The controller may turn off a fuel injector of the engine if the braking demand condition is satisfied.

Power supplied from the motor to the inverter may be calculated by a motor efficiency, a motor braking torque, and a motor speed.

A mechanical braking power of the engine may be calculated by an HSG efficiency and power supplied to the HSG.

A target speed of the engine may be calculated or selected by a predetermined map table according to the mechanical braking power.

The braking demand condition may be determined by a charging state of the battery and a braking torque demand.

The braking demand condition may include an engine braking condition in which a brake and an accelerator pedal are not operated.

The braking demand condition may include a braking operation condition.

In a hybrid vehicle having the brake function according to the present disclosure, if a torque demand is less than 0, and a state of charging of a battery is larger than a predetermined value, a motor generates electrical energy through the motor to perform an engine brake function. The electrical energy generated from the motor is not charged in the battery through an inverter, rather it is consumed by a hybrid starter and generator (HSG) that is connected to the engine, and therefore, although the state of charging of the battery is higher than a predetermined value, the engine brake function is securely performed through the motor.

DETAILED DESCRIPTION OF THE EMBODIMENTS

An exemplary embodiment of the present disclosure will hereinafter be described in detail with reference to the accompanying drawings.

Figure 1:
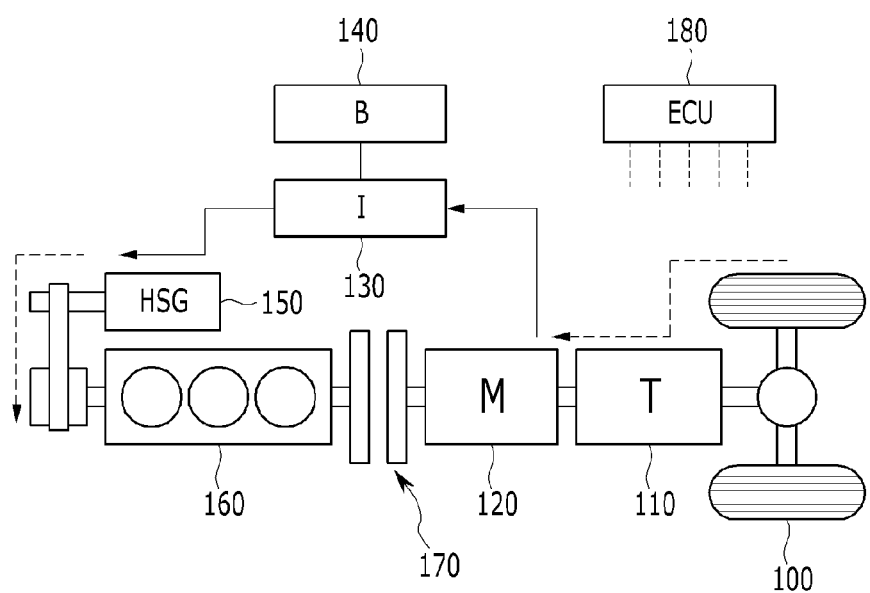
FIG. 1 is a schematic diagram of a hybrid vehicle having a brake function according to an exemplary embodiment of the present disclosure.

FIG. 1 is a schematic diagram of a hybrid vehicle having a brake function according to an exemplary embodiment of the present disclosure. Referring to FIG. 1, a hybrid vehicle includes a wheel 100, a transmission 110, a drive motor 120, a clutch 170, an engine 160, a hybrid starter and generator (HSG) 150, an inverter 130, a battery 140, and a controller 180.

A power delivery path or route is formed from the engine 160 to the wheel 100, and the clutch 170, the motor 120, and the transmission 110 are sequentially disposed on the power delivery path.

Torque outputted from the engine 160 passes through the clutch 170, the motor 120, and the transmission 110 to be transmitted to the wheel 100. The clutch 170 is engaged or released depending on a driving condition to transmit or not transmit torque of the engine 160 to the motor 120.

The motor 120 receives electrical energy from the battery 140 through the inverter 130 to increase the torque of the engine 160 or to transform the torque transmitted from the wheel 100 or the engine 160 into electrical energy, and the transformed electrical energy charges the battery 140.

The HSG 150 uses the electrical energy supplied from the battery 140 through the inverter 130 to start the engine 160, to control a rotational speed of the engine, or to generate the electrical energy through a rotational torque of the engine 160. And, the electrical energy that is generated by the HSG 150 charges the battery 140 through the inverter 130.

The controller 180 detects a state of charge (SOC) of the battery 140, controls the inverter 130 depending on a driving condition and a demand data, controls the HSG 150, the engine 160, the clutch 170, the motor 120, the transmission 110, and an injector for injecting fuel of the engine 160.

In an exemplary embodiment of the present disclosure, the controller 180 detects a charging amount of the battery 140 and a torque demand amount if the SOC of the battery 140 is higher than a predetermined value, the torque demand amount is a negative value (a braking condition), if it is determined that a braking demand condition is satisfied. Further, the fuel injector of the engine 160 is turned off, the clutch 170 is released, electrical energy is generated from the motor 120 depending on the torque demand amount, and the electrical energy generated from the motor 120 operates the HSG 150 through the inverter 130 to rotate the engine 160, if it is determined that a braking demand condition is satisfied.

Here, the braking demand condition includes a condition demanding an engine braking function when an accelerator pedal and a brake pedal are not operated or a driving condition in which a brake is operated.

If the torque demand is less than 0, wherein a driver does not operate the accelerator pedal and the brake pedal or operates a brake pedal while the driver drives a vehicle according to an exemplary embodiment of the present disclosure, the electrical energy is generated through the motor 120 to perform an engine brake function through the motor 120. The electrical energy that is generated from the motor 120 is not charged in the battery 140 through the inverter 130 and is consumed by the HSG 150, and therefore, although the SOC of the battery 140 is higher than a predetermined level, the engine brake function is securely performed through the motor 120.

Figure 2:
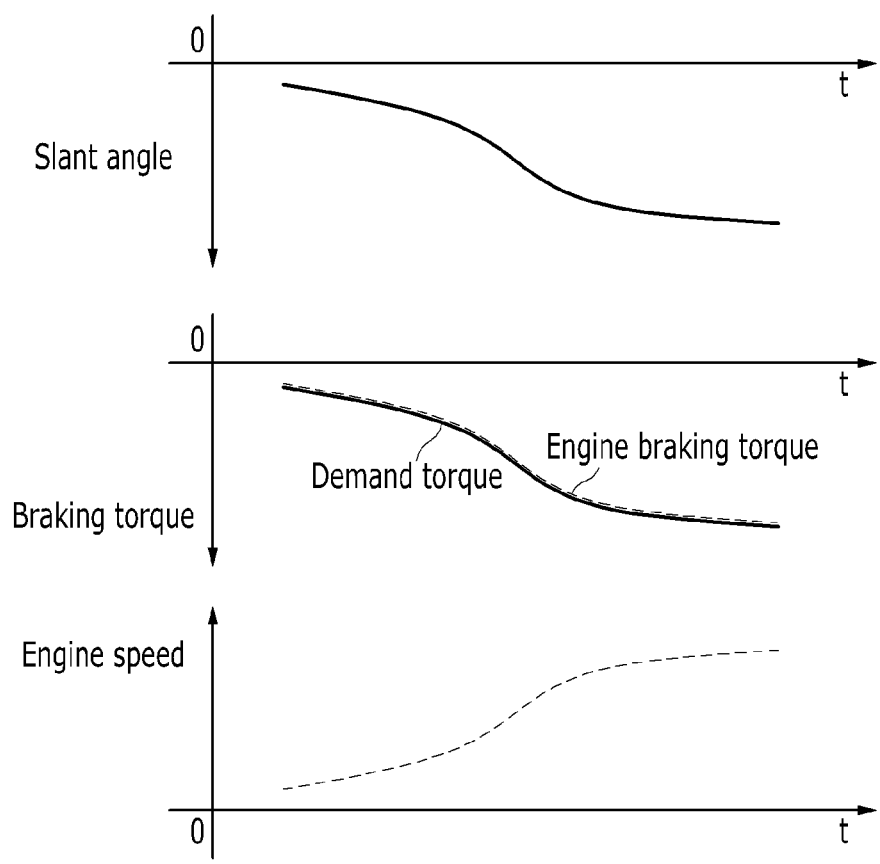
FIG. 2 is a graph showing a driving data of a hybrid vehicle according to an exemplary embodiment of the present disclosure.

FIG. 2 is a graph showing a driving data of a hybrid vehicle according to an exemplary embodiment of the present disclosure. Referring to FIG. 2, a horizontal axis denotes time, and a vertical axis denotes a slant angle, a braking torque, and an engine speed, respectively.

The slant angle has a predetermined negative value according to the time, a negative torque demand is demanded so as to perform a predetermined engine brake function, and an engine brake torque as necessary in accordance with the torque demand.

Further, the speed of the engine 160 is increased in accordance with the engine brake torque. Here, the fuel injector of the engine has a turned off condition.

Figure 3:
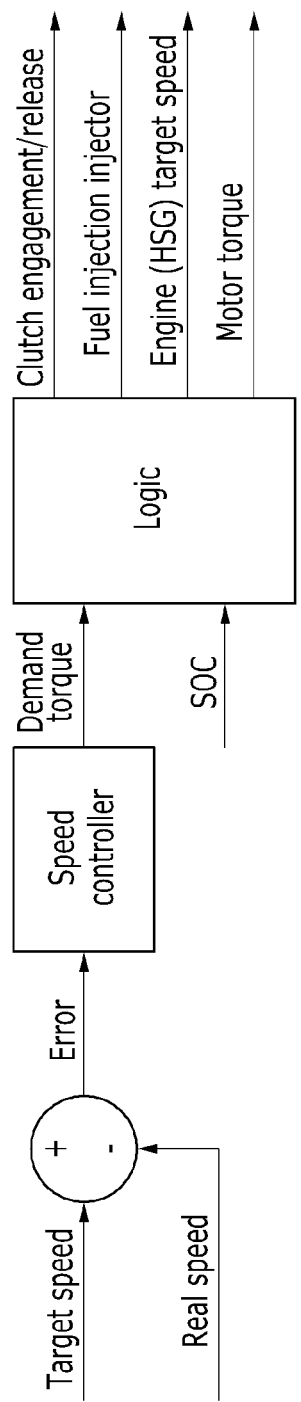
FIG. 3 is a drawing showing control factors of a hybrid vehicle according to an exemplary embodiment of the present disclosure.

FIG. 3 shows control factors of a hybrid vehicle according to an exemplary embodiment of the present disclosure. Referring to FIG. 3, a target speed and a real speed of a vehicle are input, a speed controller controls a speed of the engine 160 depending on the difference thereof, a torque demand is outputted in accordance with the difference, and the logic is performed depending on the torque demand and the SOC. Accordingly, the clutch 170 is operated or released, the fuel injector is controlled, the HSG 150 is operated, and a torque of the motor 120 is controlled.

Figure 4:
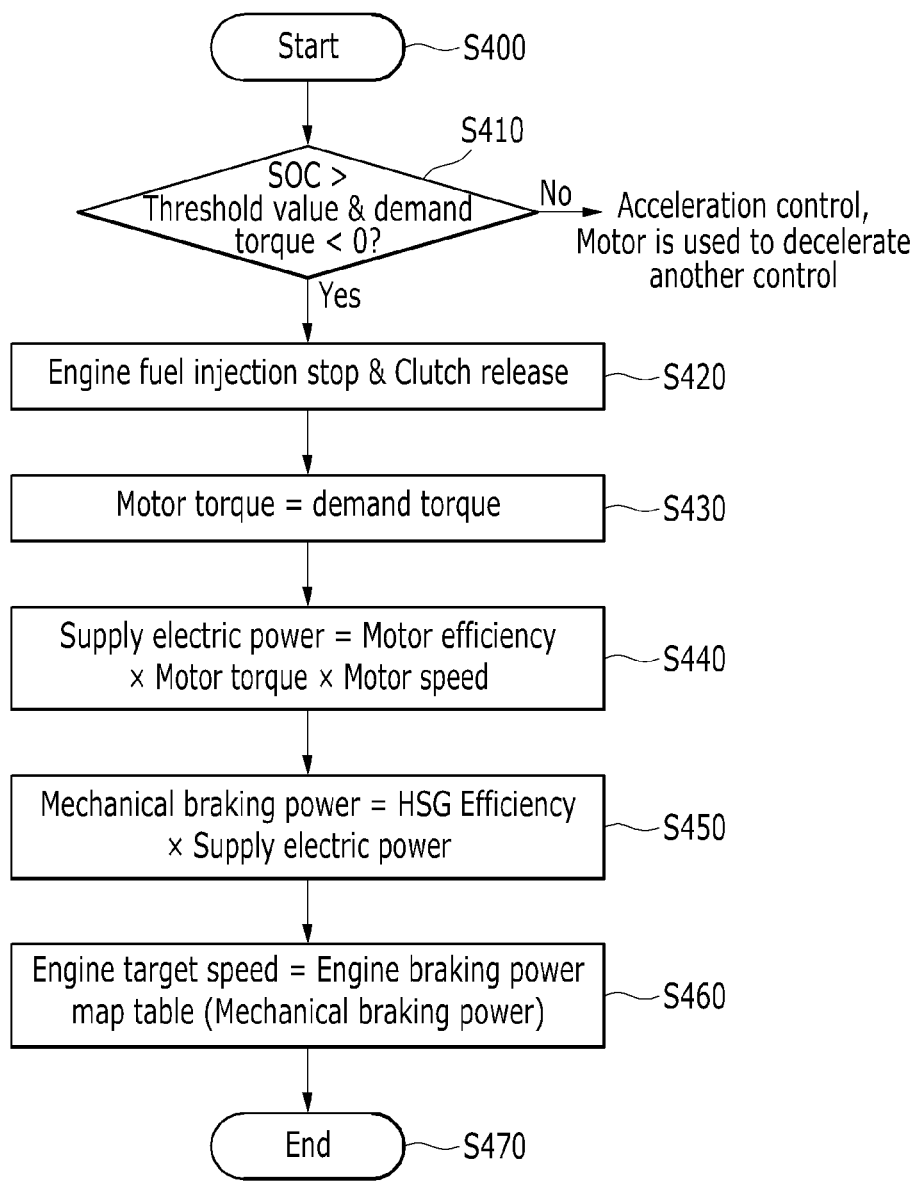
FIG. 4 is a flowchart showing a control method of a hybrid vehicle according to an exemplary embodiment of the present disclosure.

FIG. 4 is a flowchart showing a control method of a hybrid vehicle according to an exemplary embodiment of the present disclosure. Referring to FIG. 4, a control starts in step S400, and it is determined whether a SOC of the battery 140 is higher than a predetermined threshold value, and a torque demand is less than 0 in step S410.

When the SOC of battery 140 is higher than the threshold value, it signifies that the battery 140 is sufficiently charged, and when the torque demand is less than 0, it signifies that a brake is pushed, or an engine brake function is performed.

Once step S410 is satisfied, step S420 is performed, and if not satisfied, other control, such as acceleration control, (not shown) is performed. The other control is an art that has been well known to the others, and the detailed description will be omitted.

The fuel injector of the engine 160 is turned off, the clutch 170 is released in a S420, and a torque of the motor 120 is controlled in accordance with the torque demand.

The electric power generated by the motor 120 is calculated by a motor efficiency, a motor torque (a torque demand), and a motor speed.

A mechanical braking power that is input into the engine 160 is calculated by an efficiency of the HSG 150 and the electric power supplied from the motor 120 to the HSG 150 through the inverter 130.

A target speed of the engine 160 is selected or calculated by a braking power map table for the engine 160 in step S460, and the process is completed in a S470.

Figure 5:
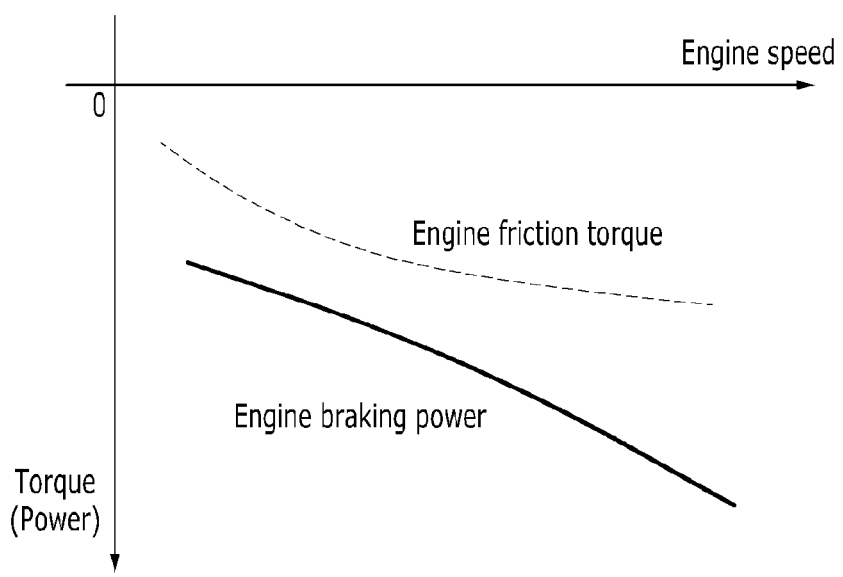
FIG. 5 is a graph showing a braking power depending on speed of an engine of a hybrid vehicle according to an exemplary embodiment of the present disclosure.

FIG. 5 is a graph showing a braking power depending on a speed of an engine of a hybrid vehicle according to an exemplary embodiment of the present disclosure. Referring to FIG. 5, a horizontal axis denotes a rotational speed of the engine 160 in a condition in which a fuel injector is turned off, and a vertical axis denotes a consuming torque (power) in accordance with the rotational speed of the engine 160. As shown, as the speed of the engine 160 is increased, a friction torque of the engine 160 and a braking power are changed. Accordingly, the braking power of the engine 160 is selected depending on a torque demand, and electric power is generated from the motor 120 according to the braking power such that a braking function is efficiently performed without charging the battery.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A hybrid vehicle having a brake function, comprising:
   a hybrid starter and generator (HSG) for starting an engine or generating electricity by the engine;
   a clutch disposed on a route for transmitting torque of the engine to a wheel, wherein the clutch selectively transmits the torque;

a motor disposed at a rear side of the clutch on the route, wherein the motor adds torque or generates electricity;

an inverter electrically connected to the HSG and the motor;

a battery electrically connected to the inverter, wherein the battery stores or outputs electrical energy;

a controller that releases the clutch, controls the motor to generate the electricity through the torque transmitted from the wheel to the motor, and controls the HSG to consume the electricity generated from the motor, if a braking demand condition is satisfied;

wherein power supplied from the motor to the inverter is calculated by a motor efficiency, a motor braking torque, and a motor speed;

wherein a mechanical braking power of the engine is calculated by an HSG efficiency and power supplied to the HSG; and wherein a target speed of the engine is calculated or selected by a predetermined map table according to the mechanical braking power.

2. The hybrid vehicle having a brake function of claim 1, wherein the controller calculates a braking torque demand depending on the braking demand condition and controls the motor to generate the electricity in accordance with the braking torque demand, and the electricity generated from the motor operates the HSG through the inverter.

3. The hybrid vehicle having a brake function of claim 1, wherein the electricity generated from the motor is not charged in the battery and is consumed by the HSG through the inverter.

4. The hybrid vehicle having a brake function of claim 1, wherein the controller turns off a fuel injector of the engine if the braking demand condition is satisfied.

5. The hybrid vehicle having a brake function of claim 1, wherein the braking demand condition is determined by a charging state of the battery and a braking torque demand.

6. The hybrid vehicle having a brake function of claim 1, wherein the braking demand condition includes an engine braking condition in which a brake and an accelerator pedal are not operated.

7. The hybrid vehicle having a brake function of claim 1, wherein the braking demand condition includes a braking operation condition.

* * * * *